US007782312B2

(12) United States Patent
Cho et al.

(10) Patent No.: US 7,782,312 B2
(45) Date of Patent: Aug. 24, 2010

(54) LIQUID CRYSTAL DISPLAY DEVICE AND METHOD OF DRIVING THE SAME

(75) Inventors: Soon Dong Cho, Gumi-shi (KR); Man Gyu Park, Seoul (KR)

(73) Assignee: LG Display Co., ltd., Seoul (KR)

( * ) Notice: Subject to any disclaimer, the term of this patent is extended or adjusted under 35 U.S.C. 154(b) by 872 days.

(21) Appl. No.: 11/169,721

(22) Filed: Jun. 30, 2005

(65) Prior Publication Data
US 2006/0139291 A1 Jun. 29, 2006

(30) Foreign Application Priority Data
Dec. 28, 2004 (KR) ........................ 10-2004-0113783

(51) Int. Cl.
*G09G 5/00* (2006.01)
(52) U.S. Cl. .................... 345/205; 345/87; 345/88; 345/89; 345/100
(58) Field of Classification Search ........... 345/98–100, 345/103, 204–206, 213
See application file for complete search history.

(56) References Cited
U.S. PATENT DOCUMENTS
2002/0067331 A1* 6/2002 Takabayashi et al. ......... 345/99
2003/0038765 A1* 2/2003 Hiraki ........................ 345/87
2003/0043100 A1* 3/2003 Moon ......................... 345/87

* cited by examiner

*Primary Examiner*—Alexander Eisen
*Assistant Examiner*—Stuart McCommas
(74) *Attorney, Agent, or Firm*—McKenna Long & Aldridge LLP (57) ABSTRACT

A LCD device includes a liquid crystal panel having a plurality of perpendicularly crossing gate and data lines, first and second display sections divided by a specific one of the data lines, a plurality of first data drive ICs driving the data lines in the first display section, a plurality of second data drive ICs driving the data lines in the second display section, and a timing controller rearranging image data input from a system into first image data corresponding to the first display section and second image data corresponding to the second display section, and simultaneously supplying the first image data and second image data, respectively, in a sequence starting from one of the first and second data drive ICs, respectively, closest to the specific data line towards one of the respective first and second data drive ICs farthest from the specific data line.

6 Claims, 8 Drawing Sheets

LIQUID CRYSTAL DISPLAY DEVICE AND METHOD OF DRIVING THE SAME

This application claims the benefit of Korean Patent Application No. P2004-113783, filed on Dec. 28, 2004 which is hereby incorporated by reference as if fully set forth herein.

BACKGROUND OF THE INVENTION

1. Field of the Invention

The present invention relates to a liquid crystal display device. More particularly, the present invention relates to a liquid crystal display device and a method of driving the same, in which the transmission sequence of image data is modified to prevent a reduction in image quality.

2. Discussion of the Related Art

In general, a liquid crystal display device includes a liquid crystal panel for displaying an image signal and a drive circuit for applying drive signals to the liquid crystal panel.

Although not shown in the drawings, the liquid crystal panel is comprised of two transparent substrates (glass substrates) bonded to each other so as to have a certain space in-between, and a liquid crystal layer formed between the two transparent substrates. On one of the two transparent substrates is formed a plurality of gate lines arranged at certain regular intervals, a plurality of data lines arranged at certain regular intervals perpendicularly to the gate lines, pixel electrodes formed respectively in pixel areas defined by the gate lines and the data lines, and a plurality of thin film transistors formed in the crossing areas of the gate lines and the data lines and switched according to scan signals of the gate lines to thereby transmit pixel voltages from the data lines to the pixel electrodes, respectively. In addition, in the other substrate is formed a black matrix layer for blocking light of the remaining portions except for the pixel areas, a color filter layer for embodying color in each pixel area, and a common electrode for applying an electric field facing the pixel electrode.

Hereafter, a related art liquid crystal display (LCD) device is explained in detail, with reference to the accompanying drawings.

Figure 1:
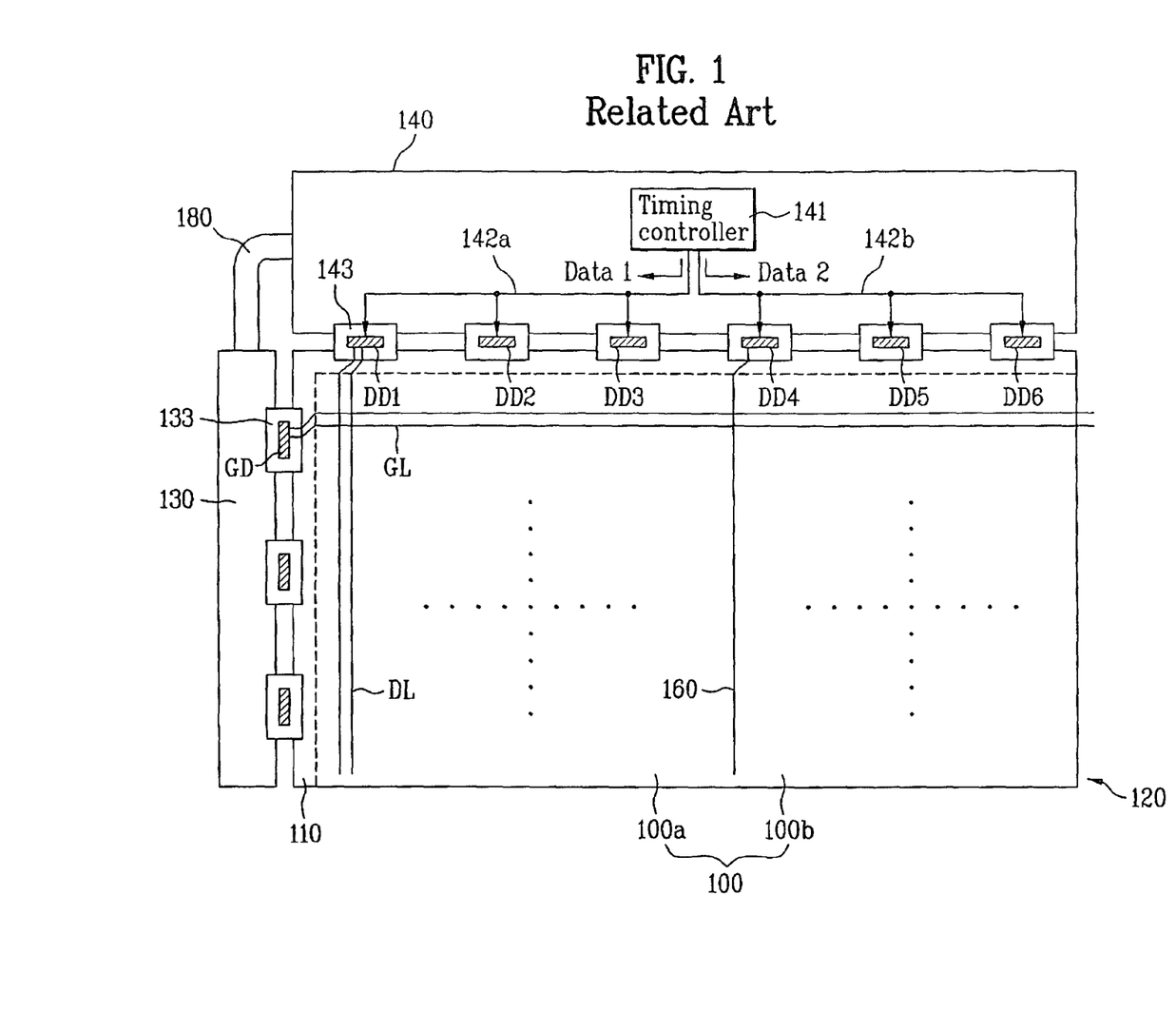
FIG. 1 shows a schematic configuration of a related art LCD device.

FIG. 1 shows a schematic configuration of a related art LCD device.

As shown in FIG. 1, the related art LCD device includes a liquid crystal panel 120 having a plurality of gate lines GL arranged in one direction, and a plurality of data lines DL arranged in one direction so as to cross perpendicularly to the gate lines GL. Here, the liquid crystal panel 120 is divided into a display section 100 for displaying a real image and a non-display section 110 to which drive ICs are connected. In addition, the display section 100 is divided into a first display section 100a and a second display section 100b by a specific data line 160 (hereinafter, referred to as a "reference data line 160") among the data lines DL.

In addition, the related art LCD device includes a plurality of first to third data drive ICs DD1, DD2, and DD3 arranged to the left of the reference data line 160 and serving to drive the data lines DL of the first display section 100a, a plurality of fourth to sixth data drive ICs DD4, DD5, and DD6 arranged to the right of the reference data line 160 and serving to drive the data lines DL of the second display section 100b, and a timing controller 141 for receiving a plurality of image data sequentially output from the system (not shown) and rearranging them into a plurality of first image data Data1 and a plurality of second image data Data2. At this time, the timing controller inputs the plurality of the first image data Data1 into the data drive ICs DD1, DD2 and DD3 of the first display section in sequence, i.e., from the first data drive IC DD1 farthest from the reference data line 160 to the third data drive IC DD3 closest to the reference data line 160. Furthermore, the timing controller inputs the plurality of the second image data Data2 into the data drive ICs DD4, DD5 and DD6 of the second display section in sequence, i.e., from the fourth data data drive IC DD4 closest to the reference data line 160 to the sixth data drive IC DD6 farthest from the reference data line 160. In addition, the timing controller 141 supplies various control signals required for each of the gate drive ICs GD through an FPC 180 and a gate TCP 133. On the other hand, although not shown in the drawings, the timing controller 141 is further provided Here, each gate drive IC GD is mounted on each gate TCP (tape carrier package) 133, and the gate TCP 133 connects the liquid crystal panel 120 with a gate printed circuit board 130. The respective data drive ICs DD1 to DD6 are mounted on the respective data TCPs 143, and the data TCP 143 connects the liquid crystal panel 120 with a data printed circuit board (PCB) 140. The gate PCB 130 and the data PCB 140 are interconnected through the flexible printed circuit (FPC) 180. Here, the timing controller 141 is mounted on the data PCB 140.

In addition, between the timing controller 141 and the first to third data drive ICs DD1, DD2 and DD3 is formed a first data transmission line 142a. A second data transmission line 142b is formed between the timing controller 141 and the fourth to sixth data drive ICs DD4 to DD6. Here, the first data transmission line 142a functions to transmit the first image data Data1 from the timing controller 141 to the first to third drive ICs DD1 to DD3. The second data transmission line 142b functions to transmit the second image data Data2 to the fourth to sixth data drive ICs DD4 to DD6.

In this way, the timing controller 141 bisects the number of image data to be displayed on a single horizontal line of the liquid crystal panel 120, i.e., divides the plurality of image data into a plurality of first image data Data1 and a plurality of second image data Data2. Also, the timing controller 141 applies the plurality of the first image data Data1 to the first to third data drive ICs DD1 to DD3 in sequence, and simultaneously applies the plurality of the second image data Data2 to the fourth to sixth data drive ICs DD4 to DD6.

The operation of the above-constructed related art LCD device will be explained below.

Figure 2:
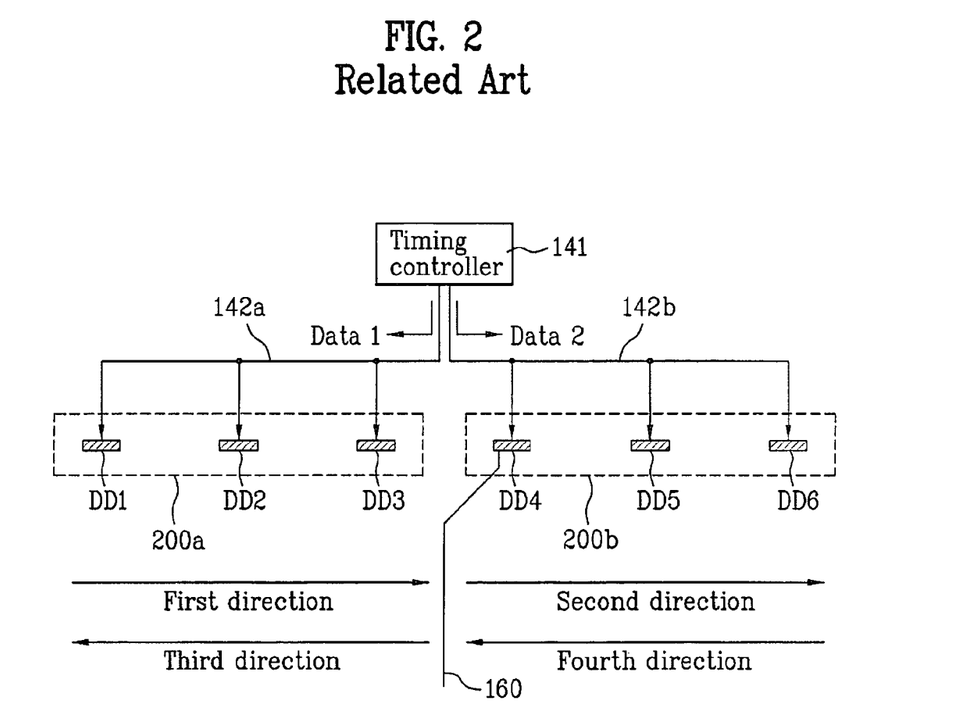
FIG. 2 explains the sequence of inputting first and second image data to each data drive IC by means of a timing controller of FIG. 1.

FIG. 2 explains the sequence of inputting the first and second image data to each data drive IC by means of the timing controller of FIG. 1.

First, the timing controller 141 receives R, G, B image data from the system and rearranges the R, G, B image data into first image data Data1 and second image data Data2, which are output at the same time. As shown in FIG. 2, the timing controller 141 inputs the first image data Data1 to the first to third data drive ICs DD1 to DD3 in sequence, i.e., from the first data drive IC DD1 farthest from the reference data line 160 to the third data drive IC DD3 closest to the reference data line 160 (the first direction in FIG. 2). At the same time, the timing controller 141 inputs the second image data Data2 to the fourth to sixth data drive ICs DD4 to DD6 in sequence, i.e., from the fourth data drive IC DD4 nearest to the reference data line 160 to the sixth data drive IC DD5 farthest from the reference data line 160 (the second direction in FIG. 2).

That is, first, the first image data Data1 is input to the first data drive IC DD1, and at the same time the second image data Data2 is input to the fourth data drive IC DD4. Then, the first image data Data1 is input to the second data drive IC DD2, and simultaneously the second image data Data2 is input to the fifth data drive IC DD5. Finally, the first image data Data1 is input to the third data drive IC DD3, and at the same time the second image data Data2 is input to the sixth data drive IC DD6.

In addition, as shown in FIG. 2, the timing controller 141 may supply the first image data Data1 in a third direction, and may supply the second image data Data2 in a fourth direction. That is, the timing controller 141 may input the first image data Data1 to the data drive ICs DD1 to DD3 sequentially, i.e., from the third data drive IC DD3 nearest to the reference data line 160 to the first data drive IC DD1 farthest from the reference data line 160 (the third direction of FIG. 2). At the same time, the timing controller 141 may input the second image data Data2 to the data drive ICs DD4 to DD6 sequentially, i.e., from the sixth data drive IC DD6 farthest from to the reference data line 160 to the fourth data drive IC DD4 nearest to the reference data line 160 (the fourth direction of FIG. 2).

In the LCD device having the above construction, if the total number of the output pins of the data drive ICs DD1 to DD6 does not match that of the whole data lines DL, the following problem occurs.

Generally, the data drive ICs DD1 to DD6 each have 642 output pins. As described above, thus, six data drive ICs DD1 to DD6 have a total of 3852 output pins (642×6). In addition, when the liquid crystal panel 120 has an XGA resolution (1280×768), the total number of data lines thereof becomes 3840 (1280×3(R,G,B)). Here, the total number (3852) of the output pins of the data drive ICs DD1 to DD6 does not exactly match that (3840) of the data lines DL. Thus, the data drive ICs DD1 to DD6 have a certain number of dummy output pins, i.e., twelve dummy output pins (the total number of output pins (3852)–the number of data lines (3840)=12).

Here, the timing controller 141 bisects 3840 image data corresponding to the total number of the data lines DL, such that the 1920 first image data Data1 are supplied to a first data drive IC group 200a and the remaining 1920 second image data Data2 are supplied to a second data drive IC group 200b. Thus, the above twelve dummy output pins are divided into six dummy output pins in the first data drive IC group 200a and six dummy output pins in the second data drive IC group 200b.

The above problem will be more specifically described below.

Figure 3:
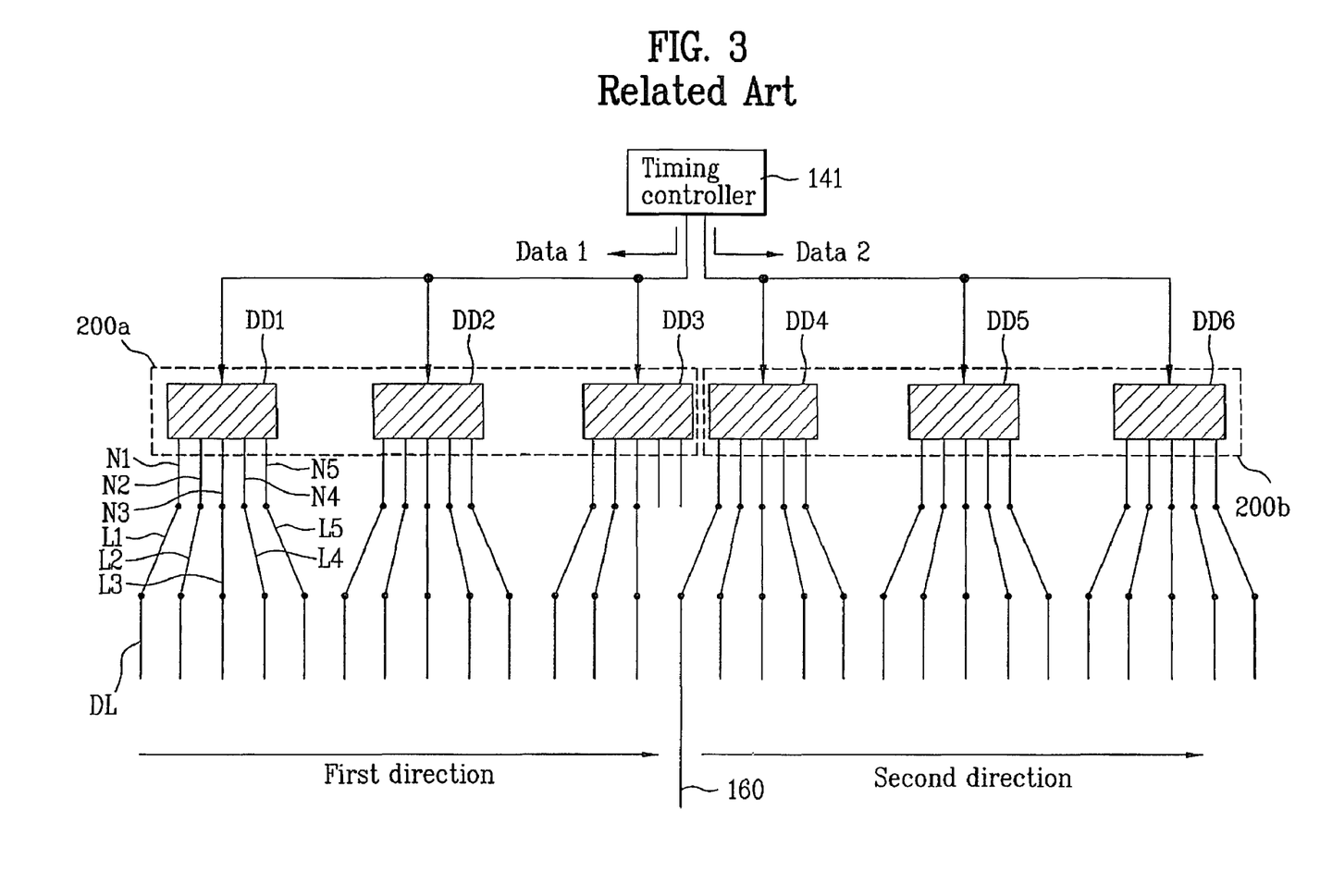
FIG. 3 shows the connection between the output pins of data drive ICs and the data lines.
Figure 4:
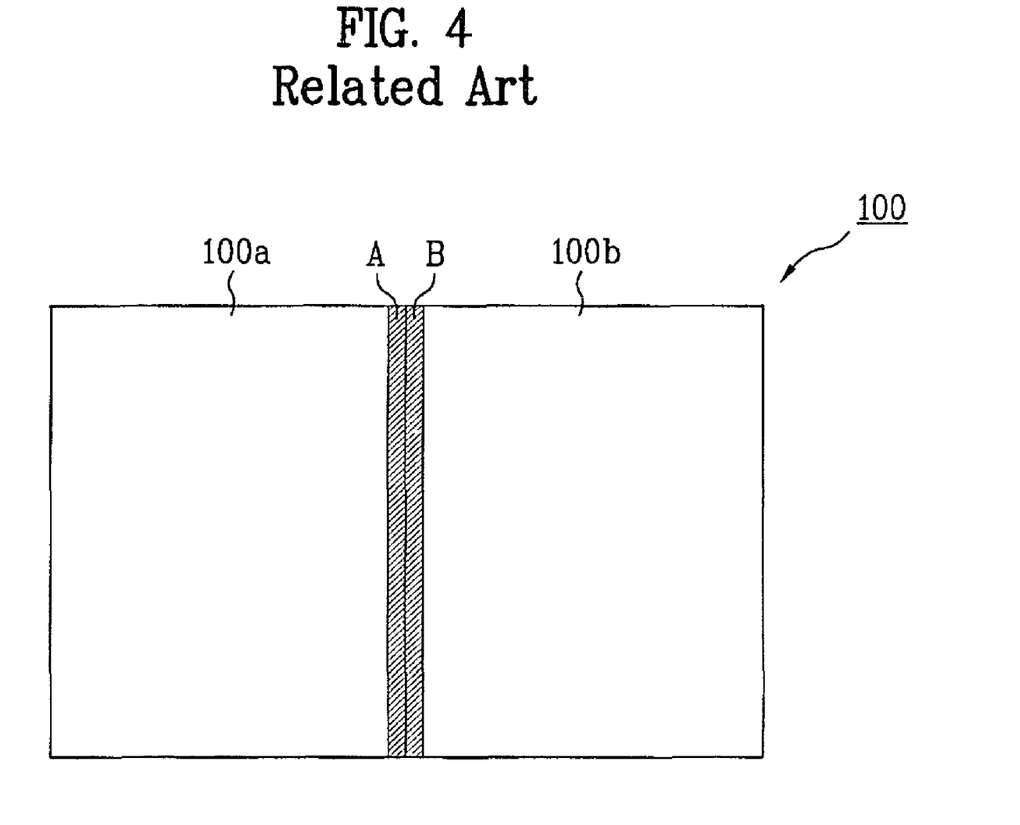
FIG. 4 shows the brightness difference between pixel areas in the central portion of a related art liquid crystal panel.

FIG. 3 shows the connection between the output pins of the data drive ICs and the data lines, and FIG. 4 shows the brightness difference between pixel areas in the central portion of a related art liquid crystal panel.

Here, for convenience of explanation, as shown in FIG. 3, it is assumed that each data drive IC DD1 to DD6 has five output pins N1 to N5, and the total number of the data lines DL is twenty six, which is four less than the total number (30) of output pins. Then, the timing controller 141 bisects the 26 image data corresponding to the total number (26) of data lines DL, and thirteen first image data Data1 are supplied to the first data drive IC group 200a and the remaining thirteen second image data Data2 are supplied to the second data drive IC group 200b.

Here, the first image data Data1 output from the timing controller 141 is filled in the first to third data drive ICs DD1 to DD3 sequentially in the first direction. The second image data Data2 are filled sequentially in the fourth to sixth data drive ICs DD4 to DD6 in the second direction. Thus, the first and second data drive ICs DD1 and DD2 and the fourth and fifth data drive ICs DD4 and DD5 are filled respectively with the first and second image data as much as the number (5) of their own output pins N1 to N5. However, the third data drive IC DD3, which is the last to be filled with the first image Data1 in the firstdata drive IC group 200a, is filled with the first image data Data1 corresponding to three output pins N1 to N3. Similarly, the sixth data drive IC DD6, which is the last to be filled with the second image data Data2 in the second data drive IC group 200b, is filled with the second image data Data2 corresponding to three output pins N1 to N3. Therefore, in the third data drive IC DD3 and the sixth data drive IC DD4, respectively, the fourth and fifth output pins N4 and N5 among the five output pins N1 to N5 are left as a dummy output pin.

Here, the fourth and fifth output pin N4 and N5 are not connected with the data line DL. Thus, the data lines DL, which are connected to the third output pin N3 of the third data drive IC DD3 and the first output pin N1 of the fourth data drive IC DD4 are adjacent to each other. Since the spacing between the output pins N1 to N5 provided in each data drive IC DD1 to DD6 differs from that of the data lines DL, link lines L1 to L5 connecting the output pins N1 to N5 of the data drive ICs DD1 to DD6 with the data lines DL have a fan-like shape. Accordingly, the third link line L3 and the first, second, fourth and fifth link lines L1, L2, L4, and L5 have a difference in their lengths. That is, the central third link line L3 is the shortest, and the farther the link line is from the central third link line, the longer it is. In other words, the central third link line L3 is the shortest. The second and fourth link lines L2 and L4 adjacent to the left and right thereof are longer than the central third one. The outermost first and fifth link lines L1 and L5 are longer than the second and fourth link lines L2 and L4.

Here, the link lines are symmetric to each other about the third link line L3 have an identical length. That is, the second and fourth link lines L2 and L4 have the same length, and the first and fifth link lines L1 and L5 have the same length.

In a case where different link lines L1 to L5 have different lengths, the link lines L1 to L5 may have different resistances. In order to avoid this, the central third data line L3 may take a serpentine form so as to have plural curvatures, not a straight form. These curvatures are formed most in the central third link line L3, and the farther a link line is from the third link line, the less curvatures it has. Thus, all the link lines L1 to L5 have almost the same length, thereby minimizing the difference in their resistance.

However, each link line L1 to L5 cannot have exactly the same length. Thus, a slight difference occurs between the resistances of the respective link lines L1 to L5. Here, because the third data drive IC DD3 has a dummy output pin, a large resistance difference occurs between the third link line L3 connected to the third output pin N3 in the third data drive IC DD3 and the first link line L1 connected to the first output pin N1 in the fourth data drive IC DD4. More specific details thereon will be described below.

That is, assume that a difference occurs in the resistance between the link lines L1 to L5 connected to each output pin N1 to N5 in the third and fourth drive ICs DD3 and DD4. Specifically, it is assumed that the third link line L3 has a resistance value of 100, the second and fourth link lines L2 and L4 have an identical resistance value of 101, and the first and fifth link lines L1 and L5 have the same resistance value of 102. Here, the reason why the first link line L1 and the fifth link line L5 have the same resistance value is that they are placed symmetric to each other. For the same reason as above, the second link line L2 and the fourth link line L4 have the same resistance value.

Here, the forth and fifth output pins N4 and N5 of the third data drive IC DD3 are dummy output pins, and thus the fourth and fifth link lines L4 and L5 are not present.

A resistance difference of one occurs between neighboring link lines. However, since the fourth and fifth link lines L4 and L5 are not present in the third data drive IC DD3, the third link line L3 of the third data drive IC DD3 and the first link line L1 of the fourth data drive IC DD4 are adjacent to each other. Consequently, the data line DL connected to the third link line L3 of the third drive IC DD3 is placed adjacent to that connected to the first link line L1 of the fourth data drive IC DD4. Here, since the resistance value of the third link line L3 of the third data drive IC DD3 is 100, and the resistance value of the first link line L1 of the fourth data drive IC DD4 is 102, the resistance difference between the third link line L3 of the third data drive IC DD3 and the first link line L1 of the fourth data drive IC DD4 becomes larger than those of other neighboring link lines. Thus, a large voltage difference occurs between the first image data Data1, which is applied to the data line connected to the third link line L3 in the third data drive IC DD3, and the second image data Data2, which is applied to the data line connected to the first link line L1 in the fourth data drive IC DD4.

As shown in FIG. 4, an increased difference in brightness occurs between pixel areas A disposed along the data line, which is connected to the third link line N2 in the third data drive IC DD3, and pixel areas B disposed along the data line, which is connected to the first link line in the fourth data drive IC DD4, thus degrading image quality. Here, since the pixel areas A and B are placed in the central region of the display section 100 in the liquid crystal panel 120, the above difference in brightness is extremely prominent.

On the other hand, as shown in FIG. 2, if the first image data Data1 and the second image data Data2 are applied to each data drive ICs DD1 to DD6 along the third and fourth directions, dummy output pins are formed in the first data drive IC DD1, in which the first image data Data1 is filled last within the first data drive IC group 220a, and the fourth data drive IC DD4, in which the second image data Data2 is filled last within the second data drive IC group 200b. In this case, the data line DL, which is connected to the third link line L3 of the fourth data drive IC DD4, and the data line, which is connected to the fifth link line L5 of the third data drive IC DD3, are positioned adjacent to each other. Thus, similar to the case where the image data is transmitted along the first and second directions, the central region of the display section 110 in the liquid crystal panel 120 has a degraded image quality.

SUMMARY OF THE INVENTION

Accordingly, the present invention is directed to a liquid crystal display device and a method of driving the same that substantially obviates one or more problems due to limitations and disadvantages of the related art.

An advantage of the present invention is to provide a liquid crystal display device and a method of driving the same, in which first and second image data are sequentially filled, starting from a data drive IC placed in the center of the display section of the liquid crystal panel towards a data drive IC placed in both edges thereof, thereby preventing reduction of image quality in the central region of the liquid crystal panel.

Additional advantages and features of the invention will be set forth in part in the description which follows and in part will become apparent to those having ordinary skill in the art upon examination of the following or may be learned from practice of the invention. These and other advantages of the invention may be realized and attained by the structure particularly pointed out in the written description and claims hereof as well as the appended drawings.

To achieve these and other advantages and in accordance with the purpose of the invention, as embodied and broadly described herein, a liquid crystal display device comprises a liquid crystal panel having a plurality of gate lines and a plurality of data lines crossing substantially perpendicular to each other, a first display section and a second display section divided by a specific one of the data lines; a plurality of first data drive ICs driving the data lines in the first display section; a plurality of second data drive ICs driving the data lines in the second display section; and a timing controller rearranging image data input from a system into first image data corresponding to the first display section and second image data corresponding to the second display section, supplying the first image data in a sequence starting from one of the first data drive ICs closest to the specific data line towards one of the first data drive ICs farthest from the specific data line, and simultaneously supplying the second image data in a sequence starting from one of the second data drive ICs closest to the specific data line towards one of the second data drive ICs farthest from the specific data line.

In another aspect of the present invention, a liquid crystal display device comprises a liquid crystal panel having a plurality of gate lines and a plurality of data lines crossing substantially perpendicular to each other, and a first display section and a second display section divided by a specific one of the data lines; a plurality of first data drive ICs driving the data lines in the first display section; a plurality of second data drive ICs driving the data lines in the second display section; and a timing controller rearranging image data input from a system into first image data corresponding to the first display section and second image data corresponding to the second display section, supplying the first image data in a sequence starting from one of the first data drive ICs farthest from the specific data line towards one of the first data drive ICs closest to the specific data line, and simultaneously supplying the second image data in a sequence starting from one of the second data drive ICs farthest from the specific data line towards one of the second data drive ICs closest to the specific data line.

In a further aspect of the present invention, there is provided a method of driving a liquid crystal display device including a liquid crystal panel having a first display section and a second display section divided by a specific data line, a plurality of first data drive ICs driving data lines in the first display section, and a plurality of second data drive ICs driving data lines in the second display section, the method comprising dividing image data input from a system into first image data corresponding to the first display section and second image data corresponding to the second display section; outputting the first image data in a sequence starting from a last-input one of the first image data, and outputting the second image data in a sequence starting from a first-input one of the second image data; inputting the first image data in a sequence starting from one of the first data drive ICs closest to the specific data line towards one of the first data drive ICs farthest from the specific data line; and inputting the second image data in a sequence starting from one of the second data drive ICs closest to the specific data line towards one of the second data drive ICs farthest from the specific data line.

In another aspect of the present invention, there is provided a method of driving a liquid crystal display device including a liquid crystal panel having a first display section and a second display section divided by a specific data line, a plurality of first data drive ICs driving data lines in the first display section, and a plurality of second data drive ICs driving data lines in the second display section, the method comprising dividing image data input from a system into first image data corresponding to the first display section and second image data corresponding to the second display section; outputting the first image data in a sequence starting from a first-input one of the first image data, and outputting the second image data in a sequence starting from a last-input one of the second image data; inputting the first image data in a sequence starting from one of the first data drive ICs farthest from the specific data line towards one of the first data drive ICs closest to the specific data line; and inputting the second image data in a sequence starting from one of the second data drive ICs farthest from the specific data line towards one of the second data drive ICs closest to the specific data line.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to the embodiments of the present invention, examples of which are illustrated in the accompanying drawings. Wherever possible, the same reference numbers will be used throughout the drawings to refer to the same or like parts.

Figure 5:
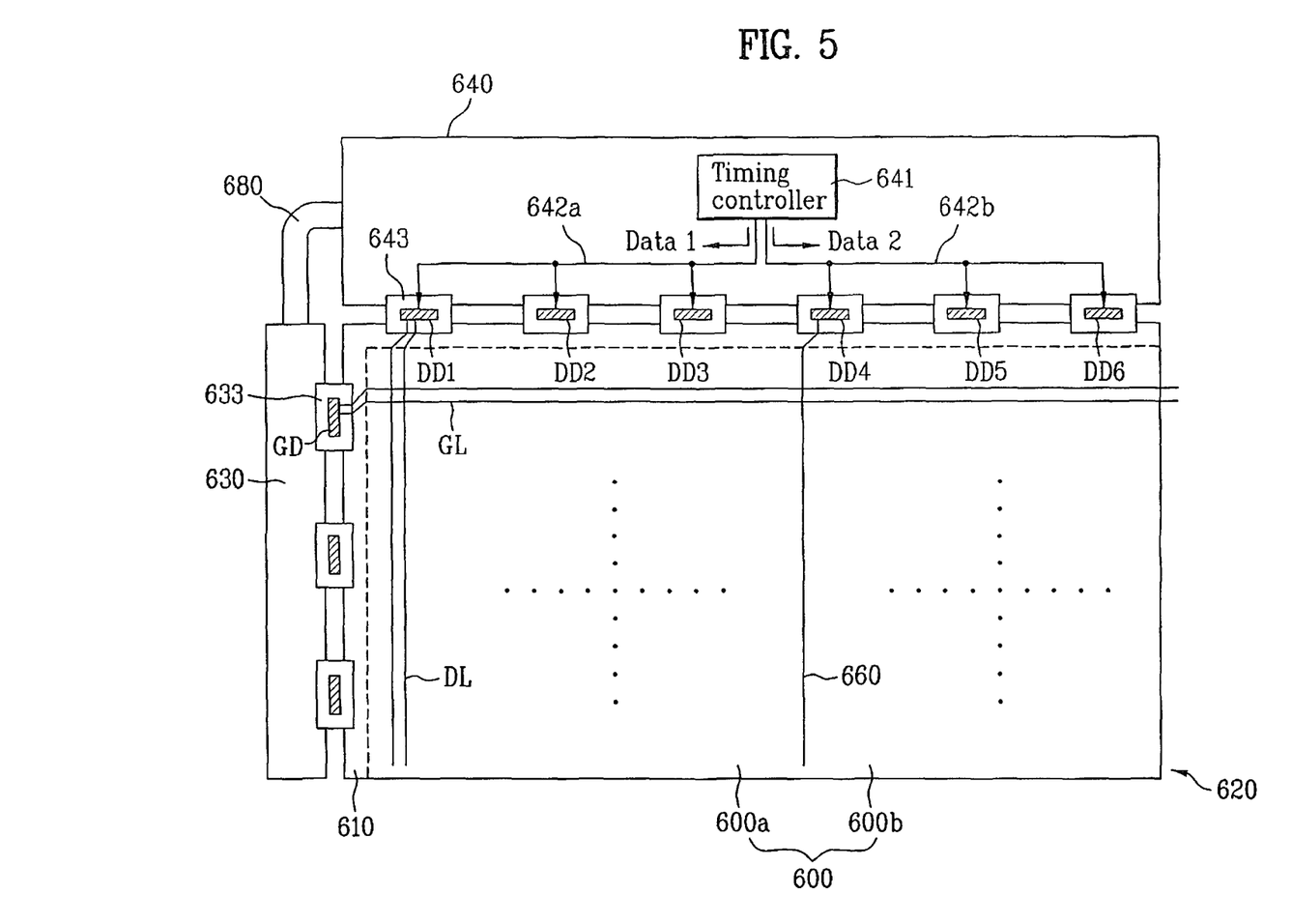
FIG. 5 shows the configuration of a liquid crystal display (LCD) device according to an embodiment of the invention.

FIG. 5 shows the configuration of a liquid crystal display (LCD) device according to an embodiment of the invention.

As illustrated in FIG. 5, the LCD device of the invention includes a liquid crystal panel 620 having a plurality of gate lines GL arranged in one direction and a plurality of data lines DL arranged in one direction so as to perpendicularly cross the gate lines GL. Here, the liquid crystal panel includes a display section 600 for displaying a real image and a non-display section 610 to which a drive circuitry is connected. In addition, the display section 600 is divided into a first display section 600a and a second display section 600b by a specific data line 660 (hereinafter, referred to as a "reference data line 660") among the data lines DL.

In addition, the LCD device of this embodiment includes a plurality of first to third data drive ICs DD1 to DD3 arranged to a left side of the reference data line 660 and serving to drive the data lines DL of the first display section 600a, a plurality of fourth to sixth data drive ICs DD4 to DD6 arranged to a right side of the reference data line 660 and serving to drive the data lines DL of the second display section 600b, and a timing controller 641 for receiving a plurality of image data output sequentially from the system (not illustrated) and rearranging the data into a plurality of first image data Data1 and a plurality of image data Data2. The timing controller 641 inputs the plurality of the first image data Data1 into the data drive ICs DD1, DD2 and DD3 of the first display section 600a in sequence, i.e., from the third data drive IC DD3 closest to the reference data line 660 to the first data drive IC DD1 farthest from the reference data line 660. Furthermore, the timing controller 641 inputs the plurality of the second image data Data2 into the data drive ICs DD4, DD5 and DD6 of the second display section 600b in sequence, i.e., from the fourth data data drive IC DD4 closest to the reference data line 660 to the sixth data drive IC DD6 farthest from the reference data line 660. In addition, the timing controller 641 supplies various control signals required for each of the gate drive ICs GD through an FPC 680. On the other hand, although not illustrated in the drawings, the timing controller 641 is further provided with a memory for storing the rearranged image data.

Here, each gate drive IC GD is mounted on each gate TCP (tape carrier package) 633, and the gate TCP 633 connects the liquid crystal panel 620 with a gate printed circuit board 630. The respective data drive ICs DD1 to DD6 are mounted on the respective data TCPs 643, and the data TCP 643 connects the liquid crystal panel 620 with a data printed circuit board (PCB) 640. The gate PCB 630 and the data PCB 640 are interconnected through the flexible printed circuit (FPC) 680. Here, the timing controller 641 is mounted on the data PCB 640.

In addition, between the timing controller 641 and the first to third data drive ICs DD1, DD2 and DD3 is formed a first data transmission line 642a. A second data transmission line 642b is formed between the timing controller 641 and the fourth to sixth data drive ICs DD4 to DD6. Here, the first data transmission line 642a functions to transmit the first image data Data1 from the timing controller 641 to the first to third drive ICs DD1 to DD3. The second data transmission line 642b functions to transmit the second image data Data2 to the fourth to sixth data drive ICs DD4 to DD6.

The reference data line 660 denotes, among the plurality of data lines DL, a data line that crosses the central region of the display section 600 in the liquid crystal panel 620. The reference data line 660 may be driven by means of the third data drive IC DD3 adjacent thereto, or may be driven by means of the fourth data drive IC DD4. The first to third data drive ICs DD1 to DD3 and the fourth to sixth data drive ICs DD4 to DD6 are arranged symmetric to each other about the reference data line 660.

Although not illustrated in the drawings, each of the first to sixth data drive ICs DD1 to DD6 includes a shift register for receiving a source start pulse (SSP) from the timing controller 641 and shifting it according to a source sampling clock (SSC) signal to thereby output a sampling signal, a data register for storing the first image data Data1 (or the second image data Data2) from the timing controller 641, a sampling latch for sampling and latching the first image data Data1 (or the second image data Data2) stored in the data register, a level shifter for level-shifting the sampled first image data Data1 (or second image data Data2) from the sampling latch into a system voltage and then outputting it, and a digital-to-analog converter for converting the first image data Data1 (or second image data Data2) from the level shifter into a gamma voltage and outputting it to the data lines of the first display section 600a (or second display section 600b) of the liquid crystal panel 620.

Hereafter, the operation of the LCD device of this embodiment having the above-described construction will be explained.

Figure 6:
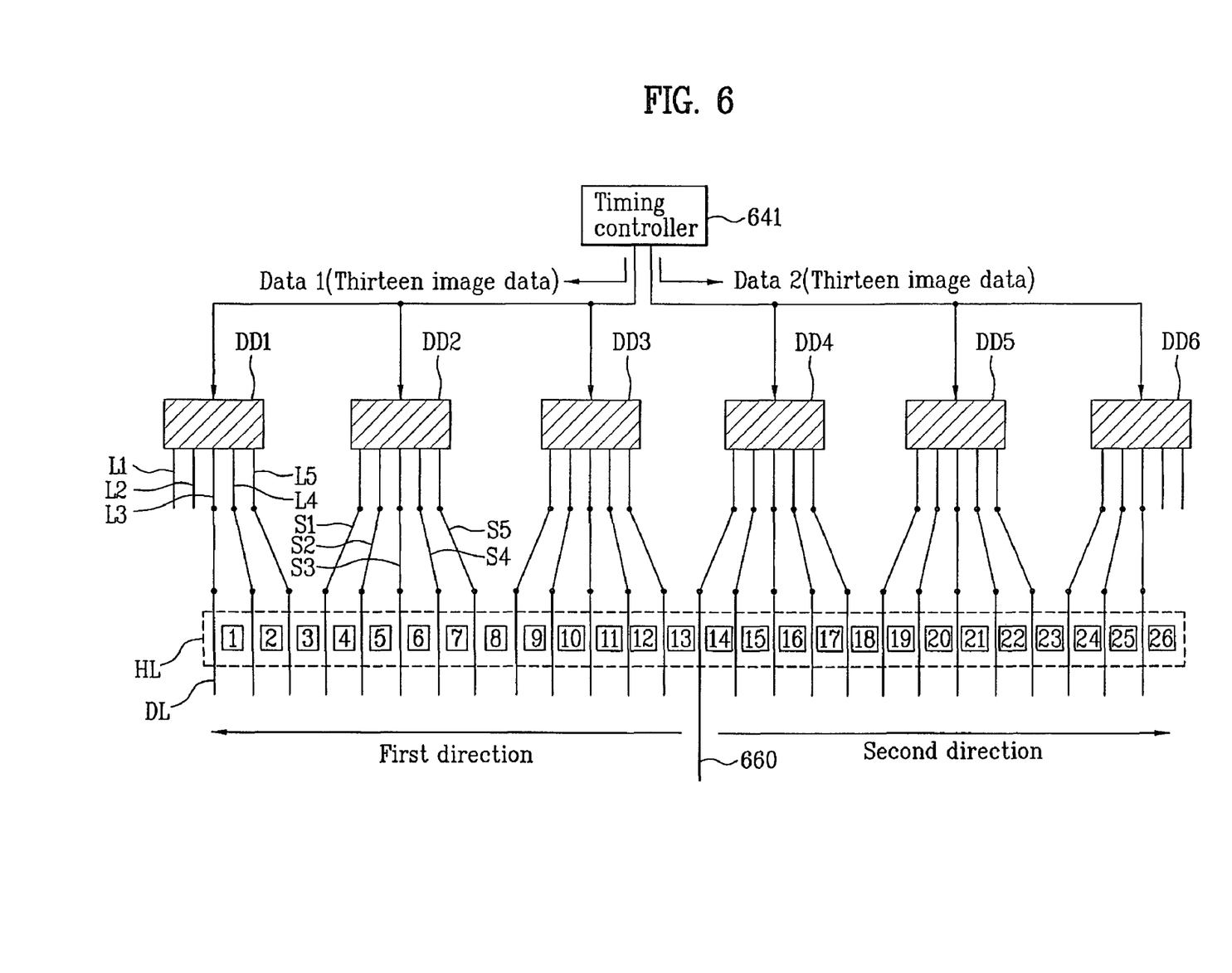
FIG. 6 explains the sequence of inputting first and second image data to each data drive IC in a first direction and a second direction by means of the timing controller of FIG. 5.

FIG. 6 explains the sequence of inputting first and second image data to each data drive IC in a first direction and a second direction by means of the timing controller of FIG. 5.

Here, it is assumed that each of the data drive ICs DD1 to DD6 has five output pins N1 to N5, and the total number of data lines DL is twenty six, which is four less than the total number (30) of the output pins N1 to N5 of the data drive ICs DD1 to DD6.

First, the timing controller 641 receives a plurality of R, G, B image data sequentially output from the system, and rearranges the data into a plurality of first image data Data1 and a plurality of second image data Data2. Here, when outputting the plurality of the first image data Data1, the timing controller 641 outputs the data in sequence starting from the last-input first image data. In contrast, when outputting the plurality of the second image data Data2, the timing controller 641 outputs them in sequence starting from the first-input second image data.

That is, for example, it is assumed that 1st to 26th image data corresponding to one horizontal line HL of the liquid crystal panel 620 are sequentially output from the system. Then, the timing controller 641 receives the 1st to 26th image data in sequence. In other words, the timing controller 641 receives the 1st image data first, and the 26th image data last. The 1st image data corresponds to the leftmost pixel area of the liquid crystal panel 620 and the 26th image data corresponds to the rightmost pixel area of the liquid crystal panel 620.

Thereafter, the timing controller 641 bisects the 1st to 26th image data, which thereby are rearranged into first image data Data1 and second image data Data2. Here, the first image data Data1 means the 1st to 13th image data corresponding to the first display section 600a, and the second image data Data2 means the 14th to 26th image data corresponding to the second display section 600b.

The timing controller 641 rearranges the first image data Data1 and stores them in a memory, such that the last-input 13th image data can be output first and the first-input 1st image data can be output last. The timing controller 641 rearranges the second image data Data2 and stores them in a memory, such that the first-input 14th image data can be output first and the last-input 26th image data can be output last.

Therefore, from the memory, the 13th image data is output first, and then the 12th, 11th, 10th, 9th, 8th, 7th, 6th, 5th, 4th, 3rd, and 2nd image data are output in sequence. The 1st image data is output last. On the other hand, the 14th to 26th image data are output in the input order.

Therefore, the timing controller 641 outputs the 13th and 14th image data at the same time such that the 13th image data is input to the third data drive IC DD3 and simultaneously the 14th image data is input to the fourth data drive IC DD4. Thereafter, the timing controller 641 outputs the 12th and 15th image data at the same time such that the 12th image data is input to the third data drive IC DD3 and simultaneously the 15th image data is input to the fourth data drive IC DD4. Next, the timing controller 641 outputs the 11th and 16th image data at the same time such that the 11th image data is input to the third data drive IC DD3 and simultaneously the 16th image data is input to the fourth data drive IC DD4. In this way, finally, the timing controller 641 outputs the 1st and 26th image data at the same time such that the 1st image data is input to the first data drive IC DD1 and simultaneously the 26th image data is input to the sixth data drive IC DD4.

In other words, the 1st to 3rd image data are input to the first data drive IC DD1 so as to correspond to the third to fifth output pins N3 to N5 thereof. The 4th to 8th image data are input to the second data drive IC DD2 so as to correspond to the first to fifth output pins N1 to N5 thereof. The 9th to 13th image data are input to the third data drive IC DD3 so as to correspond to the first to fifth output pins N1 to N5 thereof. The 14th to 18th image data are input to the fourth data drive IC DD4 so as to correspond to the first to fifth output pins N1 to N5 thereof. The 19th to 23rd image data are input to the fifth data drive IC DD5 so as to correspond to the first to fifth output pins N1 to N5 thereof. The 24th to 26th image data are input to the sixth data drive IC DD6 so as to correspond to the first to fifth output pins N1 to N5 thereof.

As the image data is transmitted in the first and second directions, the first data drive IC DD1 and the sixth data drive IC DD6 are filled last with the image data. Thus, the first and sixth drive ICs DD1 and DD2 have dummy output pins. Specifically, in the First data drive IC DD1, the first and second output pins N1 and N2 serve as dummy output pins, and in the sixth data drive IC DD6, the fourth and fifth output pins N4 and N5 serve as dummy output pins.

Therefore, the fifth output pin N5 of the third data drive IC DD3 and the first output pin N1 of the fourth data drive IC DD4 are adjacent to each other, and thus the fifth link line L5 connected to the fifth output pin N5 of the third data drive IC DD3 and the first link line L1 connected to the first output pin N1 of the fourth data drive IC DD4 are placed adjacent to each other. Consequently, the data line DL connected to the fifth link line L5 of the third data drive IC DD3 and the data line DL connected to the first link line L1 of the fourth data drive IC DD4 are placed adjacent to each other.

It is assumed that a resistance difference occurs among the link lines L1 to L5, which are connected to each output pin N1 to N5 of each data drive IC DD1 to DD5. That is, assume that in each data drive IC DD1 to DD6, the third link line L3 has a resistance value of 100, the second and fourth link lines L2 and L4 have the same resistance value of 101, and the first and fifth link lines L1 and L5 have the same resistance value of 102. Here, the reason why the first link line L1 and the fifth link line L5 have the same resistance value is that the first and fifth link lines L1 and L5 are placed symmetric to each other. Of course, for the same reasons as above, the second link line L2 and the fourth link line L4 have the same resistance value.

Here, the fifth link line L5 of the third data drive IC DD3 and the first link line L1 of the fourth data drive IC DD4, which are adjacent to each other, have the same resistance value. Thus, a significant voltage difference does not occur between the first image data Data1 supplied to the data line connected to the fifth link line L5 of the third data drive IC DD3 and the second image data Data2 supplied to the data line DL connected to the first link line L1 of the fourth data drive IC DD4. Therefore, the central region of the display section 600 in the liquid crystal panel 620 can be prevented from a reduction in image quality.

The timing controller 641 may input the first image data Data1 to the first to third data drive ICs DD1 to DD3 sequentially, i.e., from the first data drive IC DD1 farthest from the reference data line 660 towards the third data drive IC DD3 closest to the reference data line 660. The timing controller 641 may input the second image data Data2 to the fourth to sixth data drive ICs DD4 to DD6 sequentially, i.e., from the sixth data drive IC DD6 farthest from the reference data line 660 towards the fourth data drive IC DD4 closest to the reference data line 660. This will be further detailed below.

Figure 7:
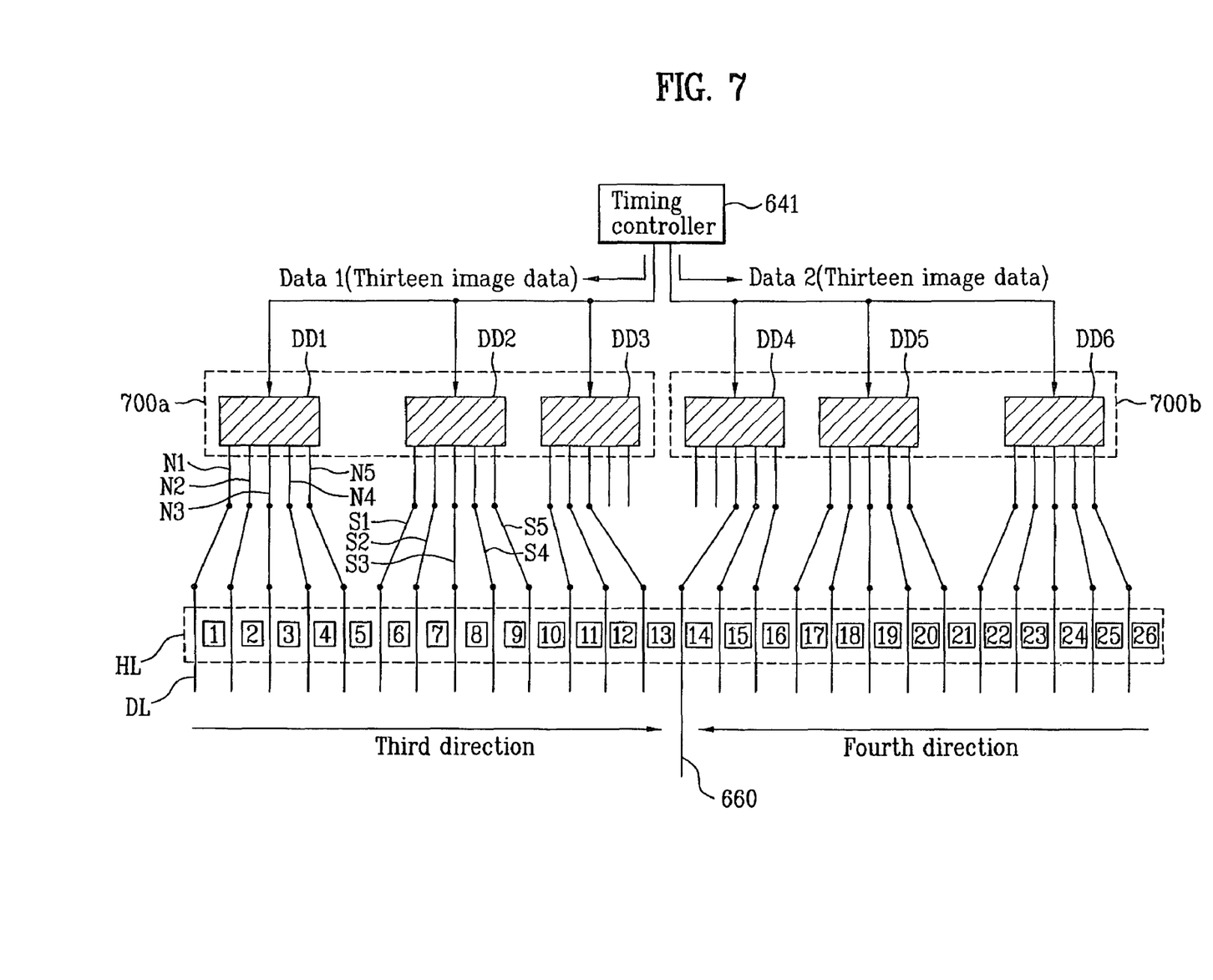
FIG. 7 explains the sequence of inputting first and second image data to each data drive IC in a third direction and a fourth direction by means of the timing controller of FIG. 5.

FIG. 7 explains the sequence of inputting first and second image data to each data drive IC in a third direction and a fourth direction by means of the timing controller of FIG. 5.

Here, it is assumed that the data drive ICs DD1 to DD6 have five output pins N1 to N5 respectively, and the total number of data lines DL is twenty six, which is four less than the total number (30) of the output pins N1 to N5 of the data drive ICs DD1 to DD6.

First, the timing controller 641 receives a plurality of R, G, B image data output sequentially from the system, and rearranges the data into first image data Data1 and second image data Data2. Here, when outputting the plurality of the first image data Data1, the timing controller 641 outputs them in sequence starting from the first-input first image data Data1. In contrast, when outputting the plurality of the second image data Data2, the timing controller 641 outputs them in sequence starting from the last-input second image data Data2.

That is, for example, it is assumed that 1st to 26th image data corresponding to one horizontal line HL of the liquid crystal panel 620 are sequentially output from the system. Then, the timing controller 641 receives the 1st to 26th image data in sequence. That is, the timing controller 641 receives the 1st image data first, and the 26th image data last. The 1st image data corresponds to the leftmost pixel area of the liquid crystal panel 620 and the 26th image data corresponds to the rightmost pixel area of the liquid crystal panel 620.

Thereafter, the timing controller 641 bisects the 1st to 26th image data, which thereby are rearranged into first image data Data1 and second image data Data2. Here, the first image data Data1 means the 1st to 13th image data corresponding to the 1st display section 600a, and the second image data Data2 means the 14th to 26th image data corresponding to the second display section 600b.

The timing controller 641 rearranges the first image data Data1 and stores them in the memory, such that the first-input 1st image data can be output first and the last-input 13th image data can be output last. On the other hand, the timing controller 641 rearranges the second image data Data2 and stores them in the memory, such that the last-input 26th image data can be output first and the first-input 14th image data can be output last. Therefore, from the memory, the 26th image data is output first, and then the 25th, 24th, 23rd, 22nd, 21st, 20th, 19th, 18th, 17th, 16th and 15th image data are output in sequence. The 14th image data is output last. On the other hand, the 1st to 13th image data are output in the input order.

Therefore, the timing controller 641 outputs the 1st and 26th image data at the same time such that the 1st image data is input to the first data drive IC DD1 and simultaneously the 26th image data is input to the sixth data drive IC DD6. Thereafter, the timing controller 641 outputs the 2nd and 25th image data at the same time such that the 2nd image data is input to the first data drive IC DD1 and simultaneously the 25th image data is input to the sixth data drive IC DD6. Next, the timing controller 641 outputs the 3rd and 24th image data at the same time such that the 3rd image data is input to the first data drive IC DD1 and simultaneously the 24th image data is input to the sixth data drive IC DD6. In this way, finally, the timing controller 641 outputs the 13th and 14th image data at the same time such that the 13th image data is input to the third data drive IC DD3 and simultaneously the 14th image data is input to the fourth data drive IC DD4.

In other words, the 1st to 5th image data are input to the first data drive IC DD1 so as to correspond to the first to fifth output pins N1 to N5 thereof. The 6th to 10th image data are input to the second data drive IC DD2 so as to correspond to the first to fifth output pins N1 to N5 thereof. The 11th to 13th image data are input to the third data drive IC DD3 so as to correspond to the first to third output pins N1 to N3 thereof. The 14th to 16th image data are input to the fourth data drive IC DD4 so as to correspond to the third to fifth output pins N3 to N5 thereof. The 17th to 21st image data are input to the fifth data drive IC DD5 so as to correspond to the first to fifth output pins N1 to N5 thereof. The 22nd to 26th image data are input to the sixth data drive IC DD6 so as to correspond to the first to fifth output pins N1 to N5 thereof.

As the image data is transmitted in the third and fourth directions, the third data drive IC DD3 and the fourth data drive IC DD4 are filled last with the image data. Thus, the third and fourth drive ICs DD3 and DD4 have dummy output pins. Specifically, in the third data drive IC DD3, the fourth and fifth output pins N4 and N5 serve as dummy output pins, and in the fourth data drive IC DD4, the first and second output pins N1 and N2 serve as dummy output pins.

Therefore, the third link line L3 connected to the third output pin N3 of the third data drive IC DD3 and the third link line L3 connected to the third output pin N3 of the fourth data drive IC DD4 are placed adjacent to each other. Consequently, the data line DL connected to the third link line L3 of the third data drive IC DD3 and the data line DL connected to the third link line L3 of the fourth data drive IC DD4 are placed adjacent to each other.

It is assumed that a resistance difference occurs among the link lines L1 to L5, which are connected to each output pin N1 to N5 of each data drive IC DD1 to DD5. That is, assume that in each data drive IC DD1 to DD6, the third link line L3 has a resistance value of 100, the second and fourth link lines L2 and L4 have the same resistance value of 101, and the first and fifth link lines L1 and L5 have the same resistance value of 102. Here, the reason why the first link line L1 and the fifth link line L5 have the same resistance value is that the first and fifth link lines L1 and L5 are placed symmetrical to each other. Of course, for the same reasons as above, the second link line L2 and the fourth link line L4 have the same resistance value. At this time, the third link line L3 of the third data drive IC DD3 and the third link line L3 of the fourth data drive IC DD4, which are adjacent to each other, have the same resistance value. Thus, no voltage difference occurs between the first image data Data1 supplied to the data line connected to the third link line L3 of the third data drive IC DD3 and the second image data Data2 supplied to the data line DL connected to the third link line L3 of the fourth data drive IC DD4. Therefore, the central region of the display section 600 in the liquid crystal panel 620 can be prevented from a reduction in image quality.

An external control signal may be applied to the timing controller 641 such that, according to the control signal, the timing controller 641 can output the first and second data Data1 and Data2 selectively in multiple directions. This will be further detailed below.

Figure 8:
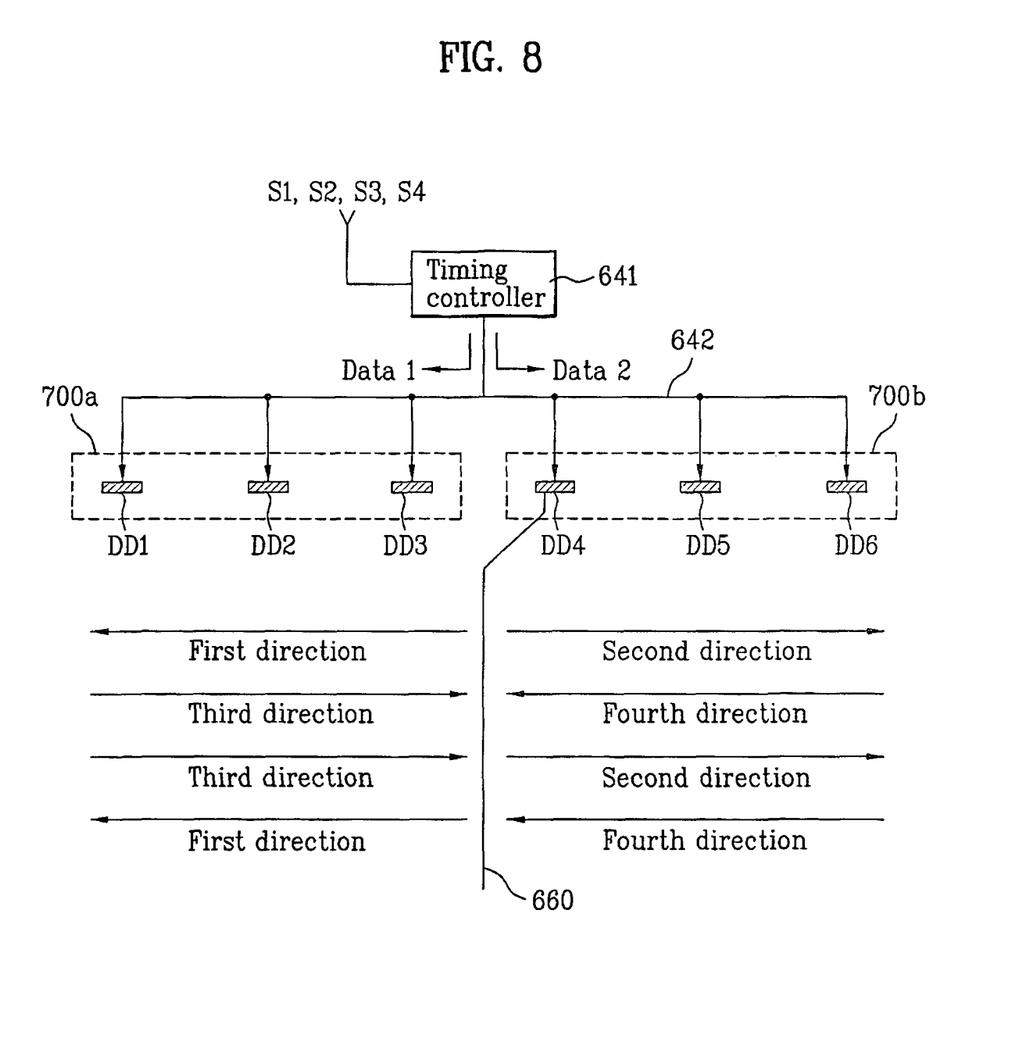
FIG. 8 shows data outputs from the timing controller in multiple directions according to a control signal.

FIG. 8 shows data outputs from the timing controller in multiple directions according to a control signal.

That is, as shown in FIG. 8, in response to an external first control signal S1, the timing controller 641 inputs the first image data Data1 to a first data drive IC group 700a along the first direction, and at the same time, inputs the second image data Data2 to a second data drive IC group 700b along the second direction. However, at this time, dummy output pins are formed in the first and sixth data drive ICs DD1 and DD6. Of course, even in the case where the total number of data lines DL provided in the liquid crystal panel 620 matches that of the output pins in the data drive ICs DD1 to DD6 and thus no dummy pin is present, the first and second image data Data1 and Data2 may be input in the first and second directions in the same manner as above.

In addition, in response to an external second control signal S2, the timing controller 641 inputs the first image data Data1 to the first data drive IC group 700a along the third direction, and at the same time, inputs the second image data Data2 to the second data drive IC group 700b along the fourth direction. However, at this time, the dummy output pins are formed in the third and fourth data drive ICs DD3 and DD4. Of course, even in the case where the total number of data lines DL provided in the liquid crystal panel 620 matches that of the output pins in the data drive ICs DD1 to DD6 and thus no dummy pin is present, the first and second image data Data1 and Data2 may be input in the third and fourth directions in the same manner as above.

In addition, in response to an external third control signal S3, the timing controller 641 inputs the first image data Data1 to the first data drive IC group 700a along the third direction, and at the same time, inputs the second image data Data2 to the second data drive IC group 700b along the second direction. However, at this time, the total number of data lines DL provided in the liquid crystal panel 620 matches that of the output pins in the data drive ICs DD1 to DD6 and thus no dummy pin is present.

Furthermore, in response to an external fourth control signal S4, the timing controller 641 inputs the first image data Data1 to the first data drive IC group 700a along the first direction, and at the same time, inputs the second image data Data2 to the second data drive IC group 700b along the fourth direction. However, at this time, the total number of data lines DL provided in the liquid crystal panel 620 matches that of the output pins in the data drive ICs DD1 to DD6 and thus no dummy pin is present.

As apparent from the above description, the liquid crystal display device and the driving method thereof according to the invention have various advantages and effects as follows.

According to the invention, the timing controller may output the first and second image data simultaneously, and the first and second image data are filled in the data drive ICs in the order from the data drive ICs placed in the central area of the display section of the liquid crystal panel towards the data drive ICs placed in both edges thereof, thereby reducing the difference in brightness among the pixel areas in the central region of the display section.

In addition, according to the invention, the timing controller may output the first and second image data simultaneously, and the first and second image data are filled in the data drive ICs in the order from the data drive ICs placed in both edges of the display section of the liquid crystal panel towards the data drive ICs placed in the central area thereof, thereby reducing the difference in brightness among the pixel areas in the central region of the display section.

It will be apparent to those skilled in the art that various modifications and variations can be made in the present invention without departing from the spirit or scope of the inventions. Thus, it is intended that the present invention cover the modifications and variations of this invention provided they come within the scope of the appended claims and their equivalents.

What is claimed is:

1. A liquid crystal display device, comprising:
a liquid crystal panel having a plurality of gate lines and a plurality of data lines crossing substantially perpendicular to each other;
a first display section and a second display section divided by a specific one of the data lines;
a plurality of first data drive ICs driving the data lines in the first display section;
a plurality of second data drive ICs driving the data lines in the second display section; and
a timing controller receiving one of first, second, third and fourth external control signals, rearranging image data input from a system into first image data corresponding to the first display section and second image data corresponding to the second display section, and
supplying the first image data independently to each one of the plurality of first data drive ICs in a sequence starting from one of the first data drive ICs closest to the specific data line towards one of the first data drive ICs farthest from the specific data line, and simultaneously supplying the second image data independently to each one of the plurality of second data drive ICs in a sequence starting from one of the second data drive ICs closest to the specific data line towards one of the second data drive ICs farthest from the specific data line, when the first external control signal is received,
supplying the first image data independently to each one of the plurality of first data drive ICs in a sequence starting from one of the first data drive ICs farthest from the specific data line towards one of the first data drive ICs closest to the specific data line, and simultaneously supplying the second image data independently to each one of the plurality of second data drive ICs in a sequence starting from one of the second data drive ICs farthest from the specific data line towards one of the second data drive ICs closest to the specific data line, when the second external control signal is received,
supplying the first image data independently to each one of the plurality of first data drive ICs in a sequence starting from one of the first data drive ICs farthest from the specific data line towards one of the first data drive ICs closest to the specific data line, and simultaneously supplying the second image data independently to each one of the plurality second data drive ICs in a sequence starting from one of the second data drive ICs closest to the specific data line towards one of the second data drive ICs farthest from the specific data line, when the third external control signal is received, or
supplying the first image data independently to each one of the plurality of first data drive ICs in a sequence starting from one of the first data drive ICs closest to the specific data line towards one of the first data drive ICs farthest from the specific data line, and simultaneously supplying the second image data independently to each one of the plurality of second data drive ICs in a sequence starting from one of the second data drive ICs farthest from the specific data line towards one of the second data drive ICs closest to the specific data line, when the fourth external control signal is received.

2. The liquid crystal display device as set forth in claim 1, wherein the first data drive IC farthest from the specific data line and the second data drive IC farthest from the specific data line have a plurality of dummy output pins that are not connected to the data lines, when the first external control signal is received.

3. The liquid crystal display device as set forth in claim 1, wherein the timing controller arranges the first image data so as to be output in a sequence starting from one of the first image data last-input thereto, and arranges the second image data so as to be output in a sequence starting from one of the second image data first-input thereto, when the first external control signal is received.

4. The liquid crystal display device as set forth in claim 1, wherein the first data drive IC closest to the specific data line and the second data drive IC closest to the specific data line have a plurality of dummy output pins that are not connected to the data lines, when the second external control signal is received.

5. The liquid crystal display device as set forth in claim 1, wherein the timing controller arranges the first image data so as to be output in a sequence starting from one of the first image data first-input thereto, and arranges the second image data so as to be output in a sequence starting from one of the second image data last-input thereto, when the second external control signal is received.

6. A method of driving a liquid crystal display device including a liquid crystal panel having a first display section and a second display section divided by a specific data line, a plurality of first data drive ICs driving data lines in the first display section, and a plurality of second data drive ICs driving data lines in the second display section, the method comprising:

receiving one of first, second, third and fourth external control signals;

dividing image data input from a system into first image data corresponding to the first display section and second image data corresponding to the second display section;

inputting the first image data independently to each one of the plurality of first data drive ICs in a sequence starting from one of the first data drive ICs closest to the specific data line towards one of the first data drive ICs farthest from the specific data line, and simultaneously inputting the second image data independently to each one of the plurality of second data drive ICs in a sequence starting from one of the second data drive ICs closest to the specific data line towards one of the second data drive ICs farthest from the specific data line, when the first external control signal is received;

inputting the first image data independently to each one of the plurality of first data drive ICs in a sequence starting from one of the first data drive ICs farthest from the specific data line towards one of the first data drive ICs closest to the specific data line, and simultaneously inputting the second image data independently to each one of the plurality of second data drive ICs in a sequence starting from one of the second data drive ICs farthest from the specific data line towards one of the second data drive ICs closest to the specific data line, when the second external control signal is received, inputting the first image data independently to each one of the plurality of first data drive ICs in a sequence starting from one of the first data drive ICs farthest from the specific data line towards one of the first data drive ICs closest to the specific data line, and simultaneously inputting the second image data independently to each one of the plurality of second data drive ICs in a sequence starting from one of the second data drive ICs closest to the specific data line towards one of the second data drive ICs farthest from the specific data line, when the third external control signal is received, or inputting the first image data independently to each one of the plurality of first data drive ICs in a sequence starting from one of the first data drive ICs closest to the specific data line towards one of the first data drive ICs farthest from the specific data line, and simultaneously inputting the second image data independently to each one of the plurality of second data drive ICs in a sequence starting from one of the second data drive ICs farthest from the specific data line towards one of the second data drive ICs closest to the specific data line, when the fourth external control signal is received.

* * * * *